No. 863,424.
PATENTED AUG. 13, 1907.
C. NEWTON & F. E. BROWN.
TWO SPEED AND AUTOMATIC COASTER AND BRAKE HUB.
APPLICATION FILED JUNE 9, 1904. RENEWED JULY 1, 1907.
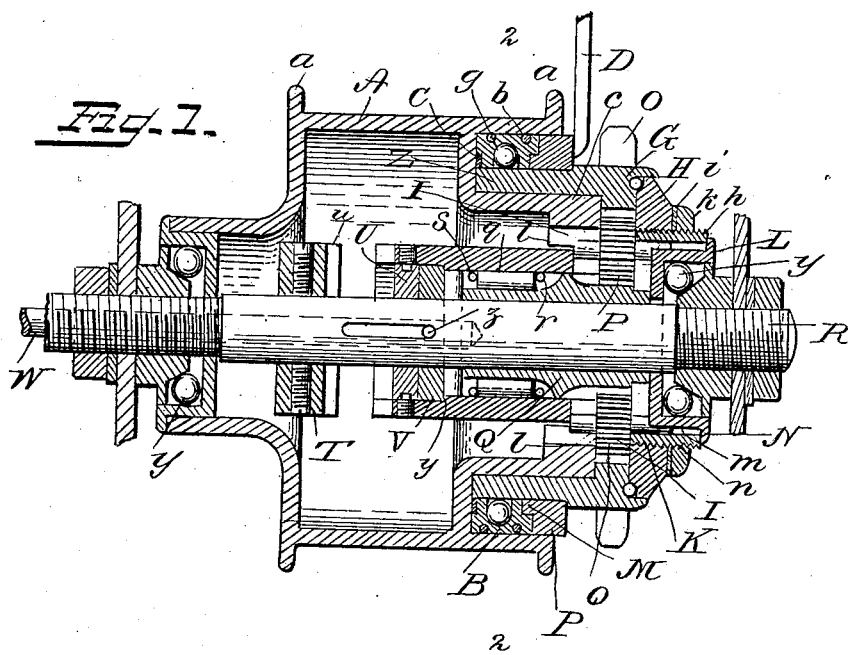
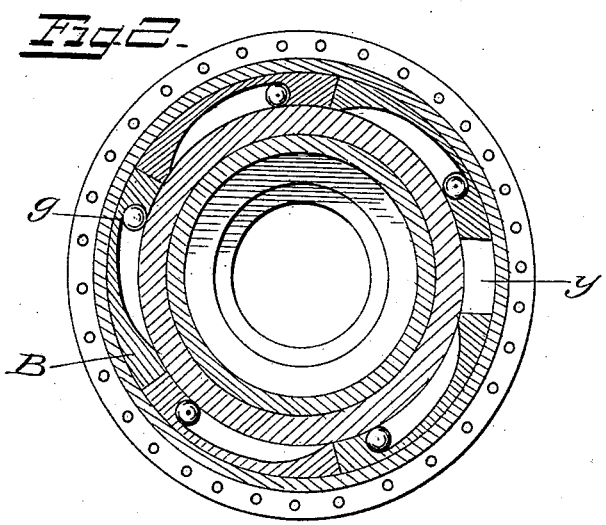
Witnesses
F. L. Durand
C. McNeil
Inventors
Charles Newton
Fred E. Brown
By Sturtevant & Greeley
Attorneys
THE NORRIS PETERS CO., WASHINGTON, D. C.

UNITED STATES PATENT OFFICE.

CHARLES NEWTON AND FRED E. BROWN, OF TORRINGTON, CONNECTICUT, ASSIGNORS TO THE STANDARD SPOKE & NIPPLE COMPANY, OF TORRINGTON, CONNECTICUT, A CORPORATION OF MAINE.

TWO-SPEED AND AUTOMATIC COASTER AND BRAKE HUB.

No. 863,424.    Specification of Letters Patent.    Patented Aug. 13, 1907.

Application filed June 9, 1904, Serial No. 211,796. Renewed July 1, 1907. Serial No. 381,735.

*To all whom it may concern:*

Be it known that we, CHARLES NEWTON and FRED E. BROWN, citizens of the United States, residing at Torrington, in the county of Litchfield, State of Connecticut, have invented certain new and useful Improvements in Two-Speed and Automatic Coaster and Brake Hubs, of which the following is a description, reference being had to the accompanying drawing and to the letters and figures of reference marked thereon.

The present invention relates to an improvement in hubs and brakes therefor, and particularly to a brake for our two speed automatic coaster hub as described and claimed in our application for Letters Patent of the United States, filed of even date herewith, Serial No. 211,795.

In the accompanying drawings which illustrate the invention, Figure 1 is a view in central longitudinal section of our hub, showing the brake construction, Fig. 2 is a transverse section on line 2—2 of Fig. 1 showing the expansible brake and the balls for operating the same.

The primary object of this invention is to provide an expansible brake wholly within the hub shell, and to provide a novel construction of brake shoe and operating means.

The construction of the hub shell in general and of the interior construction, as well as the two speed and free wheel clutch mechanism, is the same as that shown in the former application and need be referred to only with such particularity as is necessary to a complete understanding of the present invention.

In these drawings A represents the hub as a whole herein shown as made of one piece of metal, and having the flanges a—a with openings for the ends of the spokes.

The hub is recessed at b, said recess surrounding the cylindrical portion c of said hub, said recess being adapted to receive our improved brake as will be hereinafter described. The reduced portion h of the hub is provided with openings l herein shown as four in number through which project pinions I forming the intermediate gearing hereinafter referred to. These pinions rotate on pins K which are seated in bearing openings m in lugs L, on opposite sides of the pinions. Between the lugs L, are grooves to receive projections on the clutch sleeve S when the hub is to be run at high speed.

The sprocket G is provided with the internal rack O which meshes with the teeth of the pinions I, which pinions in turn mesh with the teeth on the sleeve Q which is on the stationary axle R. This sleeve extends inwardly and is surrounded by a movable clutch member S and is clutched to said movable clutch member in one direction by means of the rollers q in recesses r in the sleeve. Said rollers act to clutch the central gear to the movable member by rolling into contact with the straight wall of grooves on the inner periphery of the clutch sleeve or movable member.

The movable member S has at one end, projections adapted to engage grooves in the hub thus when in that position locking together the hub gear, that is the sprocket internal gear, the pinions and the central gear, causing the hub to rotate around the stationary axle, thus imparting the higher speed to the hub.

At the opposite end from the projections, the clutch sleeve S has notches adapted to engage projections on the stationary member T which is secured to the axle R.

The clutch sleeve is shifted by means of rod W which is connected to the collar V by means of pins z passing through a slot in the axle. Said collar V is held between collar U and shoulder y in clutch sleeve S. When the clutch sleeve S is in engagement with the stationary clutch member T, it is out of engagement with the grooves in the hub and therefore the hub and the intermediate gears will travel around on the central gear thus making the speed proportionately less than when central gear is locked to the others. The usual cone and ball bearings are provided at either end of the hub as shown at y.

It will be seen that by our invention we provide a hub which will give a high speed, low-speed, an automatic free-wheel or coaster and a brake all contained within the hub.

A convenient method of shifting from one speed to the other speed is fully described in our former application.

The construction and operation as above described are essentially the same as shown and described in our former application and we will now describe our improved brake.

In place of the brake shoe, as used in our former application, we provide the brake shoe composed of sections B, said sections being held together in a circular form by spring retainers J being held against collar C and flange M on brake shoe ring P, said collar and flange allowing sections to close only to a certain size, said sections being held against rotation by lug Y on brake shoe ring P. These sections have inclined recesses containing balls g.

Brake arm D, carrying the brake shoe ring P, is secured to a stationary part of the frame in the usual way. The sprocket G has a hub or sleeve extending inwardly between the brake sections and the cylindrical portion C, as at Z, and rests on the balls g, when said sprocket is revolved backwards, as from back pedaling said projection Z of sprocket causes balls g to ride up the inclined faces $f$ of sections B thus causing brake shoe to expand and brake hub.

Having thus fully described our invention, what we claim as new, and desire to secure by Letters Patent is:

1. The hub having the integral outer wall and cylindrical reduced portion parallel with the outer wall thus forming a recess between, an expanding brake shoe within said recess and having engagement with a stationary part of the machine frame, and having a series of recesses forming inclined planes, with balls therein, a sprocket having an integral inwardly extending hub or sleeve also within the said recess and supported upon the outer wall of the reduced cylindrical portion, the outer periphery of which rests against the balls, whereby, when the sprocket is rotated backward as in back pedaling, the balls, will cause the brake shoe to expand and brake the hub, substantially as described.

2. The hub having the integral outer wall and cylindrical reduced portion parallel with the outer wall thus forming a recess between, an expanding brake shoe within said recess and having engagement with a stationary part of the machine frame, and having a series of recesses forming inclined planes, with balls therein, a sprocket having an integral inwardly extending hub or sleeve also within the said recess and supported upon the outer wall of the reduced cylindrical portion, the outer periphery of which rests against the balls, whereby, when the sprocket is rotated backward as in back pedaling, the balls, will cause the brake shoe to expand, and brake the hub, a collar surrounding the sprocket sleeve, or hub, and a brake shoe ring having a flange, against which collar, and flange the brake shoe bears, substantially as described.

In testimony whereof we affix our signatures, in presence of two witnesses.

CHARLES NEWTON.
FRED E. BROWN.

Witnesses:
S. R. SHEPARD,
E. L. FINN.